Feb. 13, 1940.    L. H. PELSTER    2,190,219
TRAILER BRAKE
Filed Feb. 11, 1939    3 Sheets-Sheet 3
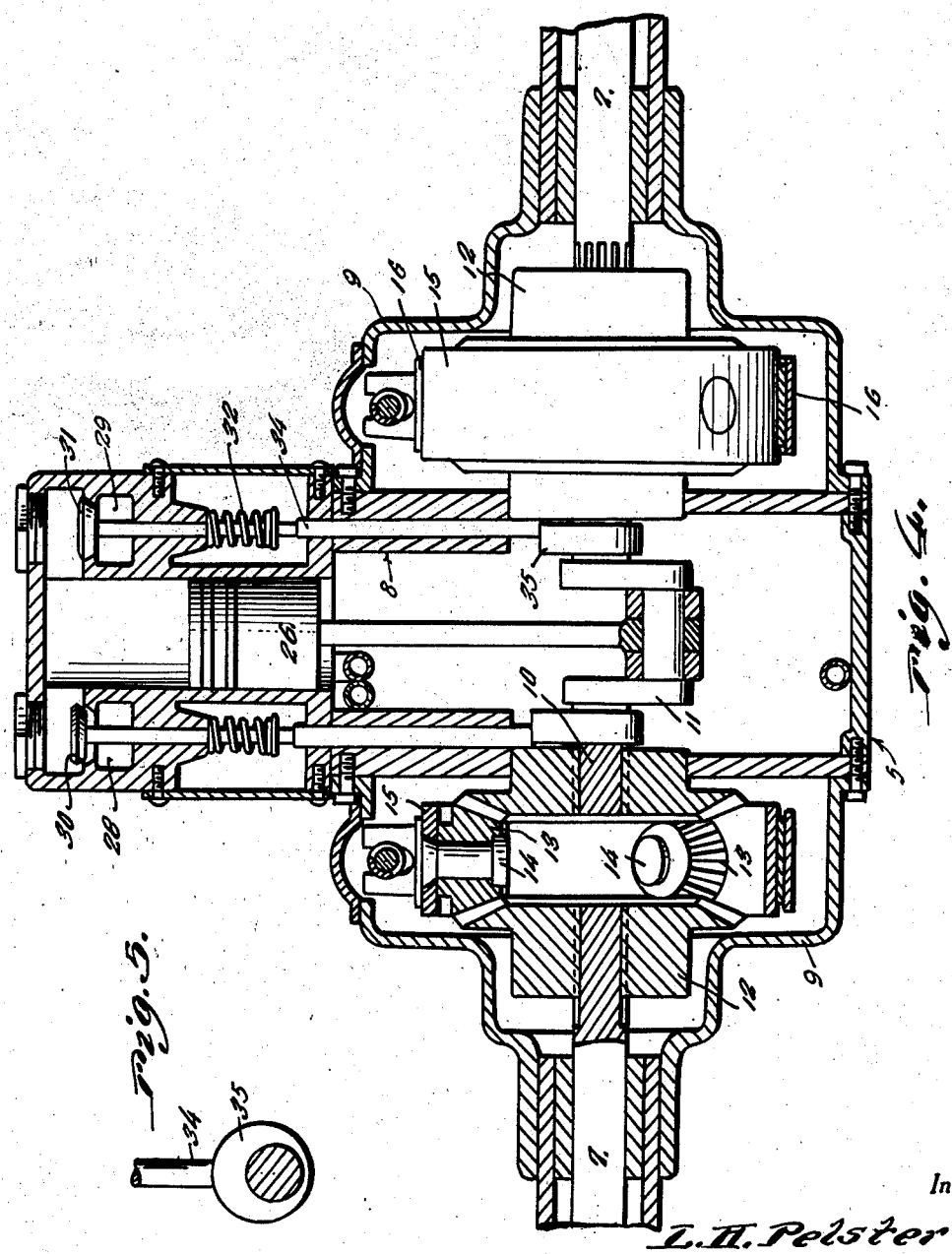

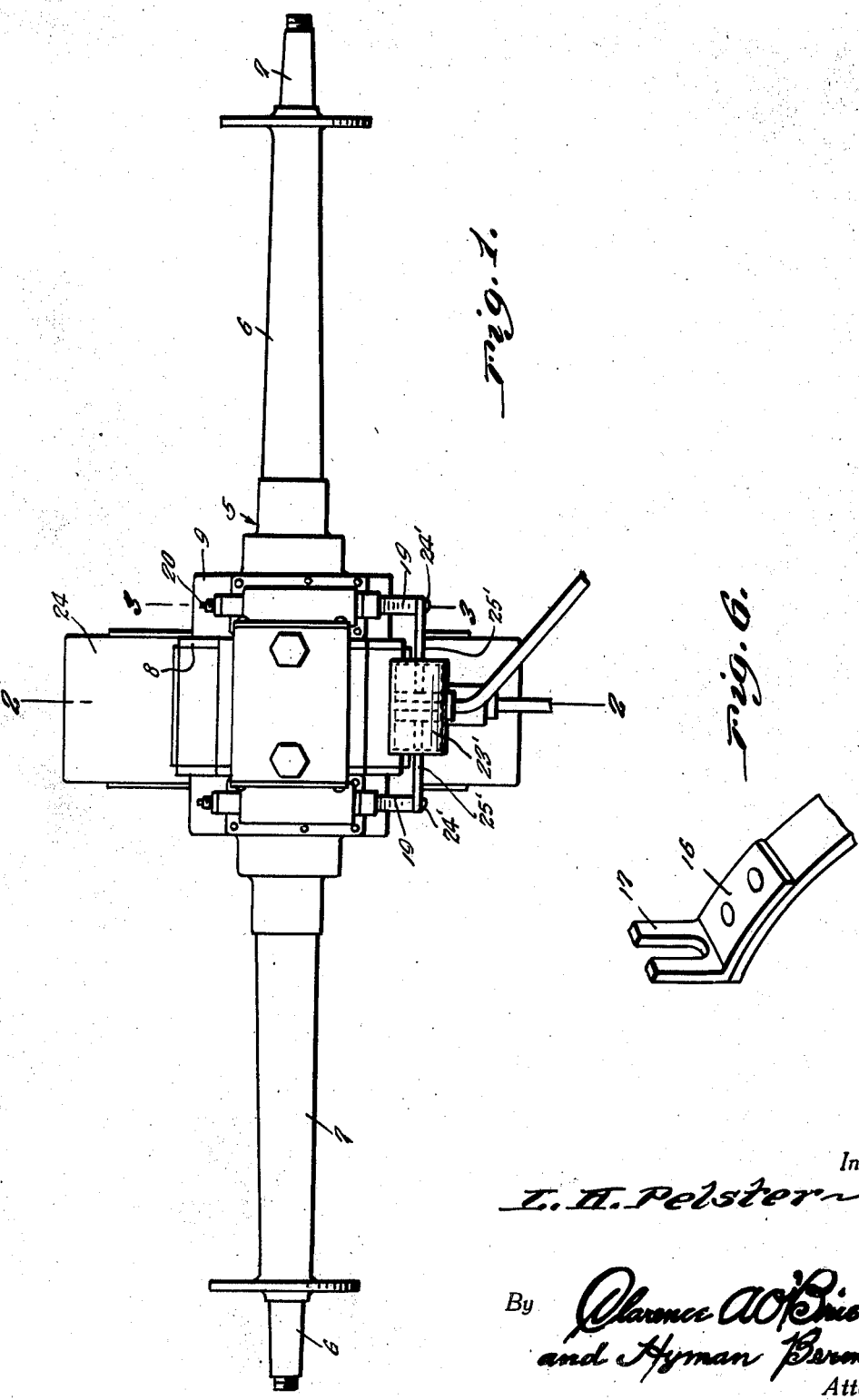

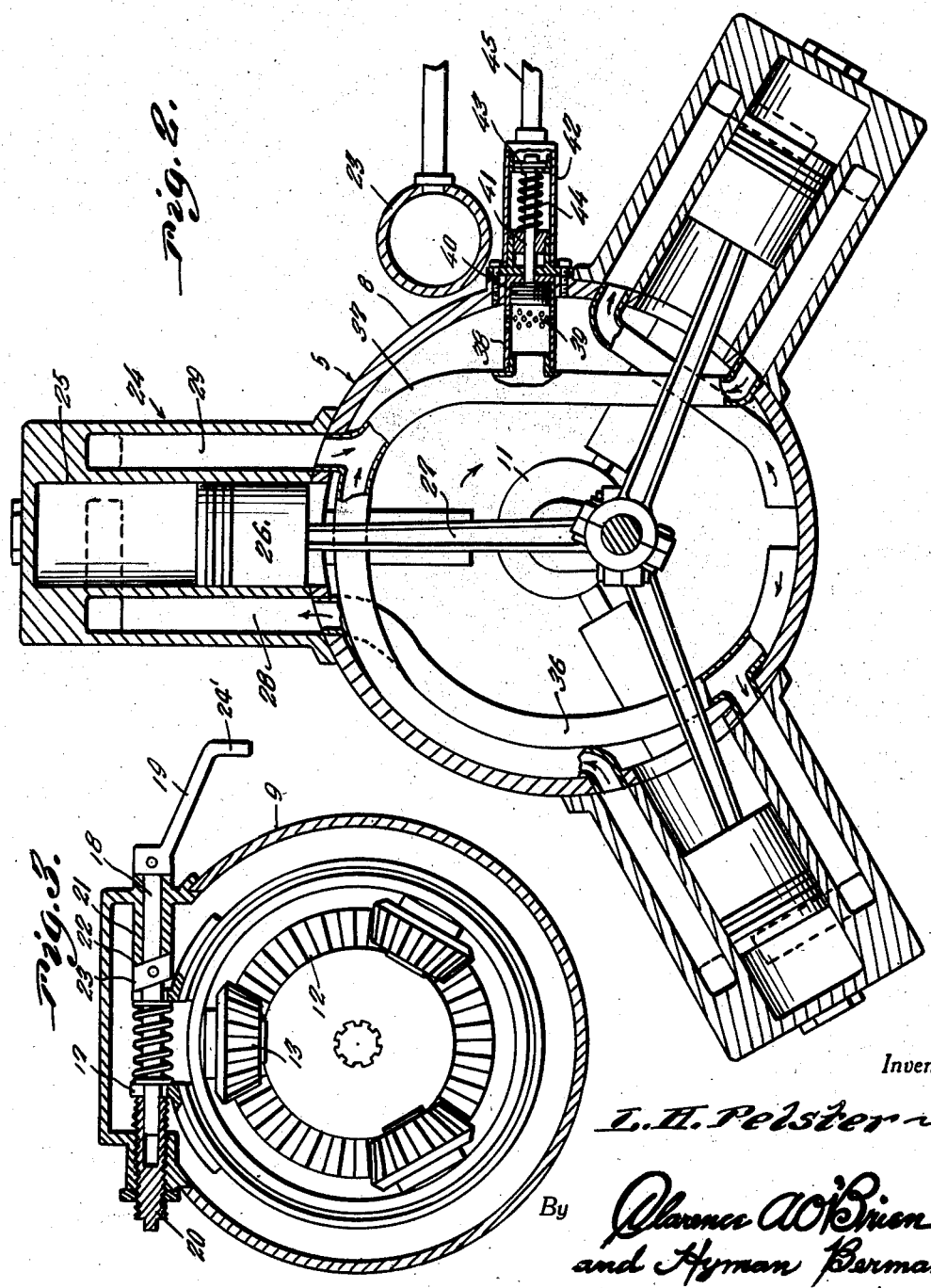

Patented Feb. 13, 1940

2,190,219

UNITED STATES PATENT OFFICE 2,190,219

TRAILER BRAKE

Lester H. Pelster, New Haven, Mo.

Application February 11, 1939, Serial No. 255,986

3 Claims. (Cl. 188—91)

This invention relates to brakes of the hydraulic type especially adapted for motor vehicle trailers and has for the primary object the provision of a device of this character which will be extremely efficient employing the rotation of the wheels of the trailer for the operation of fluid pumps for the circulation of the fluid under pressure, the circulation of said fluid being under manual control whereby the resistance of the back pressure of the fluid on said pumps may be increased and decreased for varying the braking action on the trailer wheels through said pumps along with means under manual control whereby the pumps may be rendered operative and inoperative as desired and when inoperative allowing the trailer wheels to rotate freely of any drag.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a trailer brake constructed in accordance with my invention.

Figure 2 is a sectional view taken on the line 2—2 of Figure 1 illustrating the arrangement of the pumps and the operating means therefor.

Figure 3 is a sectional view taken on the line 3—3 of Figure 1 showing one of the means for rendering the pumps operative and inoperative.

Figure 4 is a vertical sectional view showing the means of rendering the pumps operative and inoperative and also showing intake and exhaust valves for the pumps and the means of operating said valves.

Figure 5 is a detail sectional view showing one of the cams for operating one of the valves.

Figure 6 is a fragmentary perspective view showing one end of one of the brake bands.

In the drawings, the numeral 5 indicates a housing including oppositely extending tubular sleeves 6 in which axles 7 are journaled and a medial casing-like portion 8. The axles 7 are a pair of axles employed on a trailer commonly towed behind a motor vehicle (not shown). The axles 7 are of the type on which the trailer wheels may be secured. The adjacent ends of the tubular sleeves are supported by gear casings 9 secured on opposite sides of the portion 8. The axles 7 extend into the gear casings and also the ends 10 of a crank shaft 11 journaled in the portion 8 of the housing. Pairs of bevel gears 12 operate in the gear casings and one gear of each pair of gears are secured to the axles 7 by splined connections while the other bevel gears of said pairs of gears are splined on the ends 10 of the crank shaft 11. Spider gears 13 mesh with the pairs of bevel gears and said spider gears are journaled on stub shafts 14 carried by drums 15 which surround the pairs of bevel gears 12 and supported thereon by the spider gears. This gearing arrangement under normal conditions will permit the axles 7 to turn free of the crank shaft 11.

However, when the drums 15 are gripped and held then the rotation of the axles 7 will bring about rotation of the crank shaft 11.

Surrounding the drums 15 are split brake bands 16 having forked ends 17 to slidably and rotatably receive band operating rods 18 rotatably and slidably mounted in the gear casings 9 and to which are secured operating arms 19. Coil springs are mounted on the rods 18 between the forked ends of the brake bands and act on said ends for the purpose of expanding the bands free of the drums. Socketed screw threaded members 20 are threaded in the gear casings 9 and slidably receive the rods 18 while said rods are also supported by bearings 21 forming a part of the gear casings 9. The bearings 21 have cam faces 22 which coact with cams 23 secured on said rods 18 whereby rotation of the rods in one direction will bring about contraction of the bands on the drums and a rotation of the rods 18 in an opposite direction will permit the springs to expand the bands away from the drums.

The operating arms 19 are pivotally connected as shown at 24' to piston stems of a hydraulic medium 23' mounted on the casing 5 or the portion 8 thereof. The medium 23' is similar in construction to a hydraulic brake booster, as for instance, consisting of a cylinder having opposed pistons therein, the stems 25' of which are pivotally connected to the arms 19 as at 24', the pistons being urged in the direction of each other by the action of the springs expanding the brake bands and the pistons are urged apart by fluid pressure from a suitable fluid source having a control medium whereby the driver or operator may bring about the application and release of the brake bands on the drums as desired. It is to be understood that the brake bands are merely for holding the drums against rotation and when said drums are held against rotation the crank shaft is driven by the rotation of the axles 7.

Series of pumps 24 are mounted on the portion 8 of the casing 5 and each consisting of a cylinder 25 having communication with the interior of the portion 8 of the casing and in which operates a piston 26, the connecting rod 27 thereof being coupled as customary to the crank of the crank shaft 11. Thus it will be seen that rotation of the crank shaft brings about reciprocation of the pistons in the cylinders. Each cylinder has an intake passage 28 and an exhaust passage 29. Intake and exhaust valves 30 and 31 control the intake and exhaust passages to said cylinders. The valves 30 and 31 are urged in engagement with their seats by springs 32 and are engaged by push rods 34 slidable in bearings provided therefor in the casing and are actuated by cams 35 secured on the crank shaft. The valves are so timed that during the suction stroke of the piston the intake valve is opened and the exhaust valve closed and on the compression stroke of the piston the intake valve is closed and the exhaust valve is opened.

Connected to the intake passages 28 is a fluid intake pipe 36 extending from the bottom of the portion 8 of the casing 5. It is to be understood that a large quantity of fluid is placed in the portion 8 of the casing so that on the suction strokes of the pistons the fluid will be drawn into the cylinders and expelled therefrom on the compression strokes of the pistons into the exhaust passages which are in turn connected to an exhaust pipe 37, the outlet of which is connected to a cylinder 38 having a series of ports or perforations 39 controlled by a plunger type valve 40, the stem of which is indicated by the character 41 and extends into a casing 42 mounted on the portion 8 of the casing or housing 5. The casing 42 is in the form of a cylinder and the stem 41 has secured thereto a piston 43. A coil spring 44 acts on the piston 43 to drive the same in the direction of one end of the casing or cylinder 42 to which end is connected a fluid pipe 45. This fluid pipe extends to a fluid source and has a control valve therein. Normally, the spring 44 positions the valve 40 so as to uncover the ports 39 to allow the fluid circulated by the pistons 26 of the pumps to escape substantially freely into the portion 8 of the housing 5. However, when fluid pressure is applied to the piston 43, the valve 40 is moved to gradually close the ports 39 thereby gradually stopping the exhaust of fluid from the pumps and consequently creating a back pressure on the pistons of the pumps. The resistance of the back pressure on the pistons brings about braking action on the wheels of the axles 7 consequently slowing down or stopping the trailer.

In operation, to brake the trailer, the operator of the motor vehicle to which the trailer is coupled operates the control of the medium 23' to bring about contraction of the bands on the brake drums 15 thereby establishing a drive between the axles 7 of the trailer and the crank shaft. The rotation of the crank shaft by the axles reciprocates the pistons bringing about a circulation of fluid through the pumps into the exhaust pipe. The operator then actuates the control for the movement of the piston 43 to bring about closing of the ports 39 by the valve 40 stopping the escape of fluid from the pumps. The pumps continuing to operate build up a resistance of fluid pressure in the exhaust pipe and this resistance against the pistons of the pumps brings about braking action on the axles and consequently the wheels of the trailer. This braking action on the wheels of the trailer can be as gradual and as rapid as desired by the operator bringing about a gradual closing or rapid closing of the ports 39 by the amount of fluid pressure permitted to act on the piston 43. As soon as the fluid pressure is reduced or relieved on the piston 43, the spring 44 positions the valve 40 to open the ports 39 relieving the back pressure of the fluid on the pistons of the pumps, consequently stopping the braking action on the trailer wheels. The operator then, through the medium 23' and its control, frees the brake bands 16 of the drums 15 and interrupts the drive between the axles and the crank shaft thus allowing the axles to rotate freely from any drag from the pumps.

It is believed that the foregoing description, when taken in connection with the drawings will fully set forth the construction and advantages of this invention to those skilled in the art to which such device relates, so that further detailed description will not be required.

Having described the invention, what I claim is:

1. In a fluid brake, a housing including a fluid chamber and axle sleeves to receive axles of ground wheels, a crank shaft journaled in said housing, means for clutching and declutching the crank shaft to the axles, pump cylinders mounted on said housing, pistons operating in said cylinders, means connecting said pistons to the crank shaft, said cylinders having intake and exhaust passages, intake and exhaust valves for said intake and exhaust passages, cams on the crank shaft for the operation of said valves, an intake fluid pipe connected to the intake passages, an exhaust pipe connected to the exhaust passages, and a cylinder having a series of ports connected to the exhaust pipe, a valve operating in the last-named cylinder for controlling said ports.

2. In a fluid brake, a housing including a fluid chamber and axle sleeves to receive axles of ground wheels, a crank shaft journaled in said housing, means for clutching and declutching the crank shaft to the axles, pump cylinders mounted on said housing, pistons operating in said cylinders, means connecting said pistons to the crank shaft, said cylinders having intake and exhaust passages, intake and exhaust valves for said intake and exhaust passages, cams on the crank shaft for the operation of said valves, an intake fluid pipe connected to the intake passages, an exhaust pipe connected to the exhaust passages, a cylinder having a series of ports connected to the exhaust pipe, a valve operating in the last-named cylinder for controlling said ports, a fourth cylinder mounted on said housing, a stem for said valve and extending into the fourth cylinder, a piston connected to said stem, a spring acting on the last-named piston for positioning the valve to open the ports of the second-named cylinder, and hydraulic means connected to the fourth cylinder for influencing the piston to bring about closing of the ports by the valve.

3. In a fluid brake, a housing rotatably supporting wheel axles and including a fluid chamber and gear chambers, a crank shaft journaled in the fluid chamber, pairs of bevel gears located in the gear chambers and one gear of each pair of gears connected to one of the axles and the other gear connected to the crank shaft, pinions meshing with the pairs of bevel gears, drums supporting said pinions and the latter supporting said drums about and spaced from the pairs of bevel gears, brake bands surrounding said drums, and hydraulically operated means for effecting contraction and expansion of said brake bands on the drums, pumps mounted on the fluid chamber and including pistons connected to the crank shaft, and having intake and exhaust means in communication with the fluid chamber, and hydraulically operated means for controlling the escape of fluid from the exhaust means.

LESTER H. PELSTER.